[12] United States Patent
Kolodziej

(10) Patent No.: US 9,049,583 B2
(45) Date of Patent: Jun. 2, 2015

(54) IMPENDING HAZARD ALERT

(75) Inventor: Krzysztof Kolodziej, Hoboken, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 83 days.

(21) Appl. No.: 13/597,800

(22) Filed: Aug. 29, 2012

(65) Prior Publication Data

US 2014/0066097 A1  Mar. 6, 2014

(51) Int. Cl.
*H04W 4/02* (2009.01)
*G06F 13/376* (2006.01)
*H04W 4/22* (2009.01)

(52) U.S. Cl.
CPC ............... *H04W 4/22* (2013.01); *H04W 4/023* (2013.01)

(58) Field of Classification Search
CPC ............ H04M 1/72563; H04M 1/72566; H04M 1/72569; H04M 1/72572; H04M 1/72577; H04W 4/02; H04W 4/021; H04W 4/025; H04W 4/026; H04W 4/027; H04W 4/028; H04W 4/04
USPC .......... 455/404.1, 404.2, 414.1, 418, 455/456.1–457
See application file for complete search history.

(56) References Cited

U.S. PATENT DOCUMENTS

| 6,847,892 | B2 | 1/2005 | Zhou et al. | |
|---|---|---|---|---|
| 7,095,336 | B2 | 8/2006 | Rodgers et al. | |
| 2010/0099353 | A1* | 4/2010 | Komori | 455/39 |
| 2011/0009107 | A1* | 1/2011 | Guba et al. | 455/418 |
| 2012/0262582 | A1* | 10/2012 | Kimchi et al. | 348/159 |

OTHER PUBLICATIONS

D. Lavenda, "Stop Texting While Walking, Before It's Too Late," Fast Company, Mar. 16, 2012.
N. D. Lane et al., "A Survey of Mobile Phone Sensing," Ad Hoc and Sensor Networks, IEEE Communications Magazine, Sep. 2010.
S. Clarke, "Texting Woman Falls Off Pier Into Lake Michigan," ABC News, <http://abcnews.go.com/blogs/headlines/nation>, Retrieved on Jul. 27, 2012.
"The Hazards of Using Mobile Devices While Walking," Office of Compliance, www.compliance.gov, Apr. 2010.

* cited by examiner

*Primary Examiner* — Vladimir Magloire
*Assistant Examiner* — Erica Navar

(57) ABSTRACT

A mobile device identifies whether potentially distracting applications are running on the mobile device as well as the activity of the user, via at least one sensor on the mobile device. If it is determined that at least one potentially distracting application is running and the user is engaged in an activity that may become dangerous due to use of the at least one potentially distracting application, a warning is provided on a user output of the mobile device when the mobile device is within a predetermined time and/or distance of an identified hazard.

18 Claims, 5 Drawing Sheets

IMPENDING HAZARD ALERT

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless communication networks. As the wireless communication networks have evolved to provide greater bandwidth and packet based services, the industry has developed a variety of data services, such as email, web browsing, as well as a variety of services using multimedia message service (MMS) technology. Further, mobile devices have evolved to include an ever increasing number of features, including WiFi and/or cellular data network based internet access, global positioning system (GPS) capability, an accelerometer, a gyroscope, one or more cameras, etc. The advanced features support an ever increasing range of uses of the mobile devices, such as web browsing, email communication, gaming, etc. As the features and capabilities of mobile devices are steadily increasing, mobile devices are rapidly becoming the central computer and communication device for many. The compact form factor of mobile devices allows them to be used almost anytime and anywhere.

Such flexibility and convenience afforded to mobile device users does not come without problems. For example, a study conducted in 2008 by Ohio State University found that more than 1,000 pedestrians visited emergency rooms in that year alone—because they were distracted and fell, tripped, or ran into something while using a mobile device to talk or text. In March of 2012 a woman in Michigan, who was texting as she walked along a pier, was so distracted that she tripped and fell backward into Lake Michigan. In another incident, a 2011 video showing a woman texting and falling into a Pennsylvania shopping mall fountain went viral. Indeed, the news is replete with incidents where a pedestrian is seriously hurt or even killed due to distractions from their mobile device.

Hence, a need exists for an enhanced interaction between a user and a mobile device such that the mobile device provides advance warnings with respect to impending dangers.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to monitoring the location of a pedestrian and providing warnings of impending dangers. A determination is made whether an application (or combination of applications) on the mobile device may potentially distract the user. Sensors on the mobile device are used to determine the activity the user of the mobile device is likely engaged in. Localization techniques are used to determine the location of the mobile device. Warnings are generated on a user output of the mobile device when the user is approaching a potentially dangerous situation.

Figure 1:
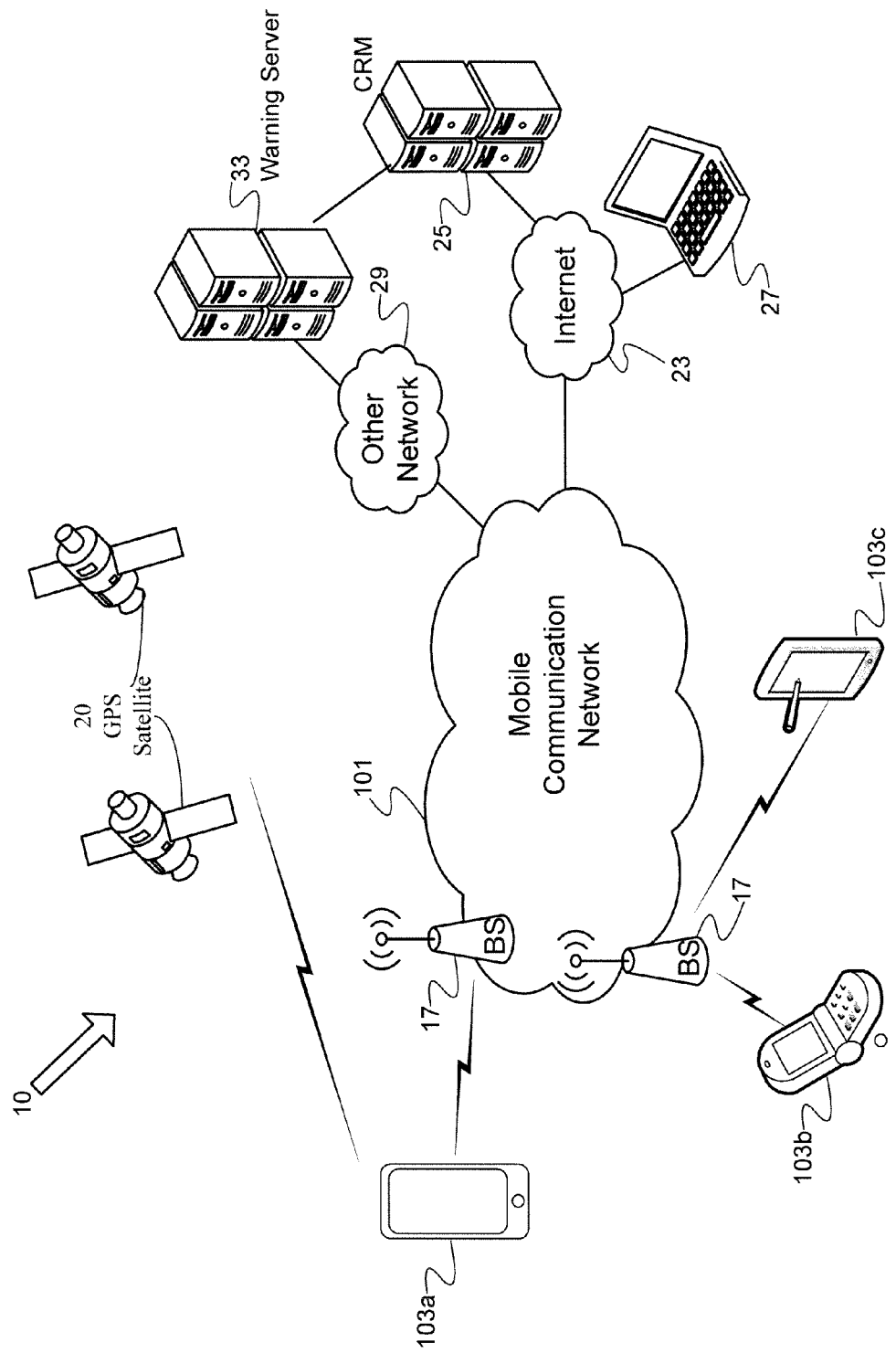
FIG. 1 illustrates a system offering an exemplary framework to provide advance warning of impending dangers to mobile device users.

Reference now is made in detail to the examples illustrated in the accompanying drawings and discussed below. FIG. 1 illustrates a system 10 offering a framework to provide advance warnings with respect to impending dangers to a potentially distracted user of a mobile device. The example shows several mobile devices 103a to 103c (collectively referred to as mobile devices) that are examples of devices that may be used for communicating through a mobile communication network 101. Mobile devices 103a to 103c, for example, can take the form of portable handsets including feature phones, smart phones and advanced phones, as well as tablet computers and mobile computers. Each mobile device 103a to 103c may include a GPS receiver that receives and processes signals from GPS satellites (e.g., 20 in FIG. 1) to determine its geographic location, as well as other sensors that provide one or more functions, including the functions to determine user distraction and/or activity discussed herein. For purposes of the advance warnings of impending dangers, each mobile device 103a to 103c can access the network 101.

GPS provides accurate position information in locations where the mobile device can receive the signals from the GPS satellites. In locations where GPS may not be available or offers reduced accuracy, for example, in buildings where a mobile device may be unable to receive enough different satellite signals to obtain a position fix, the mobile device might utilize other location techniques. Although not shown, if beacons are provided in a building, e.g., utilizing Bluetooth or WiFi frequencies, the mobile device may receive signals from a number of the beacons. Identification of beacons from which the device receives signals and measured signal strengths could then be processed (e.g., with the help of a server) to determine location of the mobile device within a building and relationship thereof to any potential hazards within the space. An accelerometer and/or other Micro-electro-mechanical Systems (MEMS) in the device may also be used to determine direction and distance moved, for example, to enhance determination of location in relation to a hazard within a building.

The mobile communication network 101 provides communications for mobile devices 103a and 103b as well as for mobile devices/users that do not participate in the advance warning system discussed herein (e.g., regular mobile devices such as cell phones, tablet computers, etc. that are not configured to provide warnings of impending dangers to the user). Thus, the network 101 may provide regular voice and data cellular services. The network 101 provides wireless communications services to the mobile devices shown and other mobile devices (not shown), via a number of base stations (BSs) 17. The present techniques may be implemented in any of a variety of available mobile networks 101 and/or on any type of mobile device compatible with such a network 101, and the drawing shows only a very simplified example of a few relevant elements of the network 101 for purposes of discussion here.

The mobile communication network 101 may be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Long Term Evolution (LTE) standard, or other standards used for public mobile wireless communications. In one example, the mobile devices 103a to 103c are capable of communications through the network 101 and receiving warning information from the warning server 33. The mobile devices 103a to 103c are capable of data communications through the particular type of network 101, and the users thereof typically will have subscribed to data service through the network.

The network 101 allows users of the mobile devices such as 103a to 103c (and other mobile devices not shown) to receive hazard information from the warning server 33 that is configured to maintain hazard information. The network 101 typically offers a variety of data services via the Internet 23, such as downloads, web browsing, email, messaging, etc. By way of example, the drawing shows a laptop PC type user terminal 27 as well as a customer relations management (CRM) server 25 connected to the Internet 23; and the data services for the mobile devices 103a to 103c via the Internet 23 may be with devices like those shown at 25 and 27 as well as with a variety of other types of devices or systems capable of data communications through various interconnected networks.

The mobile communication network 101 can be implemented by a number of interconnected networks. Hence, the overall network 101 may include a number of radio access networks (RANs), as well as regional ground networks interconnecting a number of RANs and a wide area network (WAN) interconnecting the regional ground networks to core network elements. A regional portion of the system 10, such as that serving the mobile devices 103a to 103c, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station 17 and over the airlink with one or more of the mobile devices 103, when the mobile devices 103a to 103c are within range. Each base station 17 can include a BTS coupled to several antennae mounted on a radio tower within a coverage area often referred to as a "cell." The BTS is the part of the radio network that sends and receives RF signals to/from the mobile devices 103a to 103c that are served by the base station 17. The network can also include other elements that support functionality other than providing hazard information, such as messaging service messages and voice communications. Specific elements of the mobile communication network 101 for carrying the voice and data traffic, and for controlling various aspects of the calls or sessions through the network 101, are omitted here for simplicity. It will be understood that the various network elements can communicate with each other, as well as other aspects of the mobile communication network 101, and other networks (e.g., the public switched telephone network (not shown) and the Internet 23) either directly or indirectly.

The carrier may also operate a number of systems that provide ancillary functions in support of the communications services and/or application services provided through the mobile communication network 101, and those elements communicate with other nodes or elements of the mobile communication network 101, such as one or more private IP type packet data networks 29 (sometimes referred to as an Intranet), i.e., a private network. Generally, such systems are part of or connected for communication via the private network 29 of the establishment discussed herein. It will be understood that systems outside of the private network could serve the same functions as well. Examples of such systems, in this case operated by the network service provider as part of the overall system 10, which communicate through the intranet type network 29, include one or more warning servers 33. The warning server may be operated by the network service provider as part of the overall system 10 or an independent third party.

In one example, applications, including an application to make warning service selections and provide warnings of impending dangers, can be configured to execute on many different types of mobile devices 103a to 103c. For example, a mobile device application can be written for a "binary runtime environment for wireless" (BREW-based) mobile station, a Windows Mobile based mobile station, an Android mobile station, Apple iOS devices (I-Phone or iPad), Java Mobile device, or RIM based mobile station such as a BlackBerry or the like. Some of these types of devices can employ a multi-tasking operating system.

The warning server 33 is configured to provide hazard information to mobile devices 103a to 103c. For example, mobile device 103a communicates with the warning server 33 over the mobile communication network 101 to receive hazard information from the warning server 33. Warning server 33 may include maps and/or floor-plans of various areas and buildings. Hazard information may include location information for a traffic/accident, a construction site, a step, stairs, a pole, a wall, a fence, an intersection, a border (e.g., fence), a body of water, a traffic lane, and other physical impediments for pedestrians. In one example, the hazard information of the warning server 33 is updated regularly and/or whenever an incident occurs (e.g., a fallen tree is reported to the warning server 33). The warning server 33 further includes (or has access to) map and/or location information of each hazard.

In one example, the warning server 33 provides hazard information to a mobile device (e.g., 103a) upon a request from the mobile device (e.g., 103a). The request may be triggered automatically (e.g., by activation of an application on the mobile device 103a in response to determination by the mobile device that that the user may be distracted by an application or is engaged in potentially dangerous activity while using the mobile device 103a). In one example, the use of the application (as determined by a separate application running on the mobile device 103a), rather than the application itself, triggers the request. Thus, the trigger for the request may be limited to a predetermined (e.g., factory determined and perhaps automatically updated) application or user determined set of applications. A common characteristic of such a set of applications may be, for example, whose use generally requires a known extended period of viewing by the user. For example, a user may start reading e-mail as soon as stepping out of the subway station. Thus, the user is engaged in both (i) using a distracting application (i.e., e-mail) and (ii)

an activity (i.e., walking) that is potentially dangerous if the user is distracted, which automatically may trigger a request by the mobile device to receive the latest hazard information from the warning server 33. Under such a circumstance, as soon as the user approaches a dangerous scenario (e.g., intersection) an alarm is triggered on the mobile device 103*a*.

In another example, the user may manually trigger a request for an update of hazard information for an area (e.g., when there or prior to getting to the area). For example, if the mobile device is in or will soon be in a particular tourist area of a city and sufficient storage is available in the device, then either manually or automatically, the device could download the hazard information for that tourist area of the city.

The location may be determined by the GPS receiver of the mobile device 103*a*. The hazard information provided by the warning server is a function of the location information received from the mobile device 103*a*. Put differently, the hazard information provided by the warning server 33 is a function of the location of the mobile device 103*a*. In another example, the hazard information from the warning server 33 is provided to the mobile device 103*a* periodically (e.g., every hour). The hazard information update may occur either through "push" or "pull" communication, which is described in more detail in a later section.

In one example, the system 10 may also include or have access to a Customer Relationship Manager (CRM) server 25, which is coupled for communication via the private network 29. In one example, the CRM server 25 offers its account holders (e.g., user of a mobile device) on-line access to a variety of functions related to the account holders' account, such as on-line payment information, subscription changes, when hazard information is to be provided to the mobile device (e.g., 103*a*), password control, etc. The CRM server 25 includes subscription related information about the hazard notification service (e.g., as to whether or not a security protection service is associated with the account of a particular mobile device and what the account holder preferences are). The CRM server 25 may provide the user an interface via the Internet 23. Hence, a user's terminal, such as PC 27, may be used to access on-line information about a mobile device user's account, which the mobile carrier makes available via the carrier's web site accessible through the Internet 23.

Figure 2:
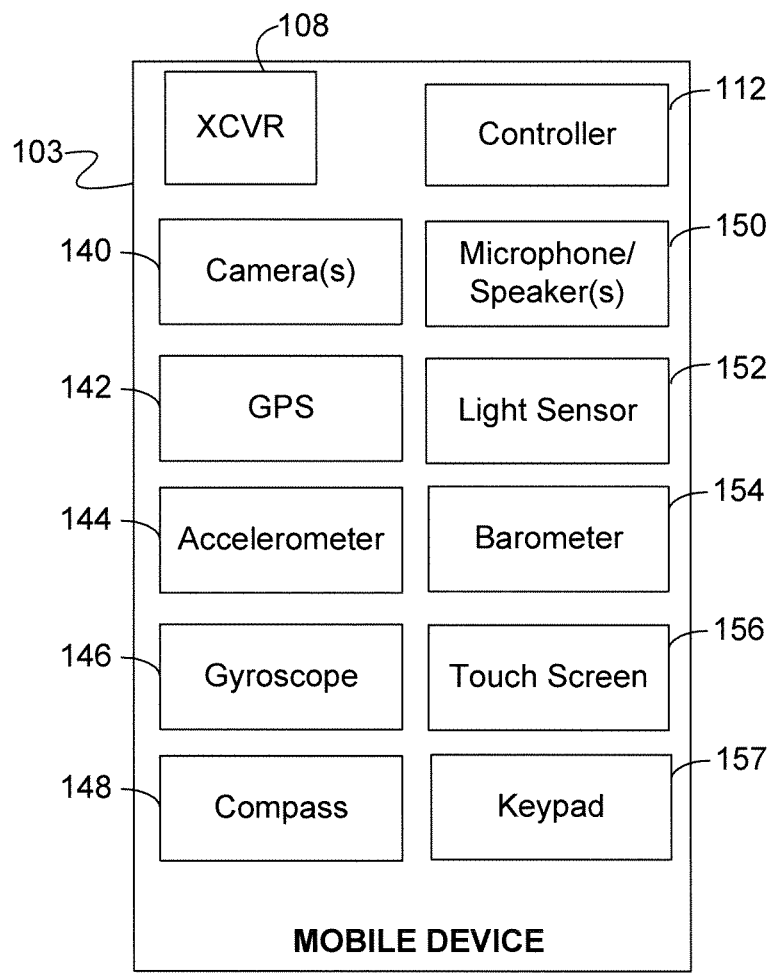
FIG. 2 illustrates an exemplary block diagram 100 of a mobile device having several sensors.

A mobile device includes various sensors, for a variety of input functions in support of various uses of or applications of the mobile device. In the detailed examples discussed below, various such sensors also may be used to determine the location, distraction level, and/or activity of the mobile device user in support of the hazard warning functionality. FIG. 2 illustrates an exemplary block diagram 100 of a mobile device having several sensors. For example, a mobile device may include one or more cameras 140, a GPS 142, an accelerometer 144, a gyroscope 146, a compass 148, one or more microphones 150, and a light sensor 152. Indeed, each generation of mobile device technology introduces additional sensors and improves their capability to enhance the user experience of the mobile device.

One or more cameras 140, in addition to taking regular pictures and video, can be used by the mobile device for specialized sensing. For example, the front camera may provide information from which eye position and movement with respect to a user interface (e.g., touch screen) of the mobile device can be tracked. In this regard, the mobile device can be configured to determine whether the user is watching the screen on the mobile device (e.g., as opposed to the street) while the back camera can be used to sense proximity to physical objects.

Operations of some or all of the sensors may be controlled in a manner to conserve power. For example, if used to determine user-eye position, the camera may be turned on only periodically. The periodicity may vary as a function of location (e.g., more frequent in city streets vs. rural areas) or as a function of the running application (e.g., a short term viewing application such as email versus watching a video).

The GPS sensor 142 enables the mobile device 103 to determine its three-dimensional (3D) geographic location. For example, the GPS receiver 142 obtains time of flight measurements based on signals received from three of more satellites of the GPS constellation. Based on identification of the satellites from which the signals were received and known positions of the satellites, a processor (in the mobile device or in a server) determines the geographic position of the mobile device 103.

The physical location of the mobile device 103 can be correlated with map information and the hazards identified thereon by the mobile device 103. For example, such hazard information of the potential dangers of a geographic region is provided by the warning server 33. The mobile device 103 uses the hazard information (obtained from the warning server 33) to provide warnings of impending dangers on the mobile device 103.

The gyroscope 146 and the compass 148 provide an extension of location and direction. For example, they provide the mobile device 103 an increased awareness of its position in relation to the physical surroundings (e.g., direction and orientation) and the impending physical hazards.

An accelerometer 144 may be used to determine the orientation in which the user of the mobile device is moving as well as the speed of movement. Information from the accelerometer 144 may help a processor of the mobile device 103 characterize the physical movements of the user. For example, patterns within the accelerometer data can be used to recognize different activity, such as standing, walking, jogging, climbing stairs, etc. In one example, a barometer 154 is used (e.g., together with the accelerometer) to more accurately characterize activity, such as climbing stairs.

Further, in one example, the combination of sensor information (e.g., GPS information, accelerometer data, etc.,) can more accurately characterize the mode of transportation (walking, vehicle, train, bike, etc.,) of the user of the mobile device 103. For example, speed information from the GPS receiver (e.g., coupled with map information) can be used to track location over time. Consequently, the mobile device can determine, for example, that the user is driving on a particular highway. Accelerometer data (e.g., the pattern of the shaking of the mobile device 103) may help determine the activity of the user. In turn, the activity of the user of the mobile device 103 may be used to determine whether the activity is compatible with the application the user is running on the mobile device 103 (i.e., the user is engaged in dangerous activity). For example, if the mobile device 103 identifies that the user of the mobile device 103 is engaging in, for example, texting, the camera of the mobile device 103 identifies that the eyes of the user are on the screen of the mobile device (e.g., instead of on the street), and the comparison of the location and movement information to the information about the location of the actual hazard information (e.g., obtained from the warning server 33) indicates that the user is approaching an intersection, an alert is generated on the user output (e.g., display) of the mobile device 103. Alternately, the camera may not be used and instead an alert may be generated automatically when the application is detected to be active, the location matches that of the actual hazard information and the mobile device is determined to be moving below a threshold (e.g., walking) speed.

The mobile device 103, in one example, includes a touch screen 156 (and/or keypad 157) that is configured to receive information from the user and to provide feedback to the user of the mobile device 103. Thus, the screen 156 itself may be a sensor, in which usage triggers the request and/or generation of an alert. Alternatively, usage within a predetermined period of reaching a location matching that of the hazard information may result in generation of an alert. Further, the mobile device 103 may include one or more microphones and speakers 150 to receive voice signals and to provide audible warnings to the user. Mobile device 103 may also include a haptic element (not shown) to provide haptic feedback to the user. Various combinations of the touch screen 156, speaker 150, and haptic element, may be used as the physical input and/or output elements of the mobile device 103 to provide advance warning information.

In one example, a light sensor is used to determine the level of light surrounding the mobile device 103. For example, a warning of an impending danger is generated earlier under dark ambient conditions. In one example, the darker the conditions, the earlier the warning is generated on the mobile device 103. Thus, when approaching a railroad track that is not well-lit at night, the threshold distance to trigger a warning is shorter.

In some embodiments, transmitters located near potential hazards may also provide localized signals to the mobile device 103. For example, low power transponders associated with potential hazards (e.g., light poles, traffic lights, mailboxes, stairs, corner, etc.) may provide signals that can alert the mobile device 103 of the impending danger. Such a signal may have a range of several feet to yards, depending on the type of hazard, while being of low enough power not to require FCC licenses for the band on which it is transmitting. The transmitter may be isolated from the network, or may be linked through the network to one or more servers to receive and/or provide information therewith (possibly on a different transmission band). The mobile device 103 may detect a signal from the transmitter and provide an advance hazard warning in a manner similar to that described elsewhere herein.

The mobile device 103 also includes at least one digital transceiver (XCVR) 108 for mobile communication and a controller (e.g., microprocessor) 112 to serve as a programmable controller or processor, to control operations of the mobile device 103 in accord with programming that it executes, for all normal operations, operations in controlling each sensor, and for operations involved in receiving hazard information from warning server 33 and providing advance warning information to the user, as discussed herein. The transceiver 108 and controller 112 are discussed in more detail in a later section.

Figure 3:
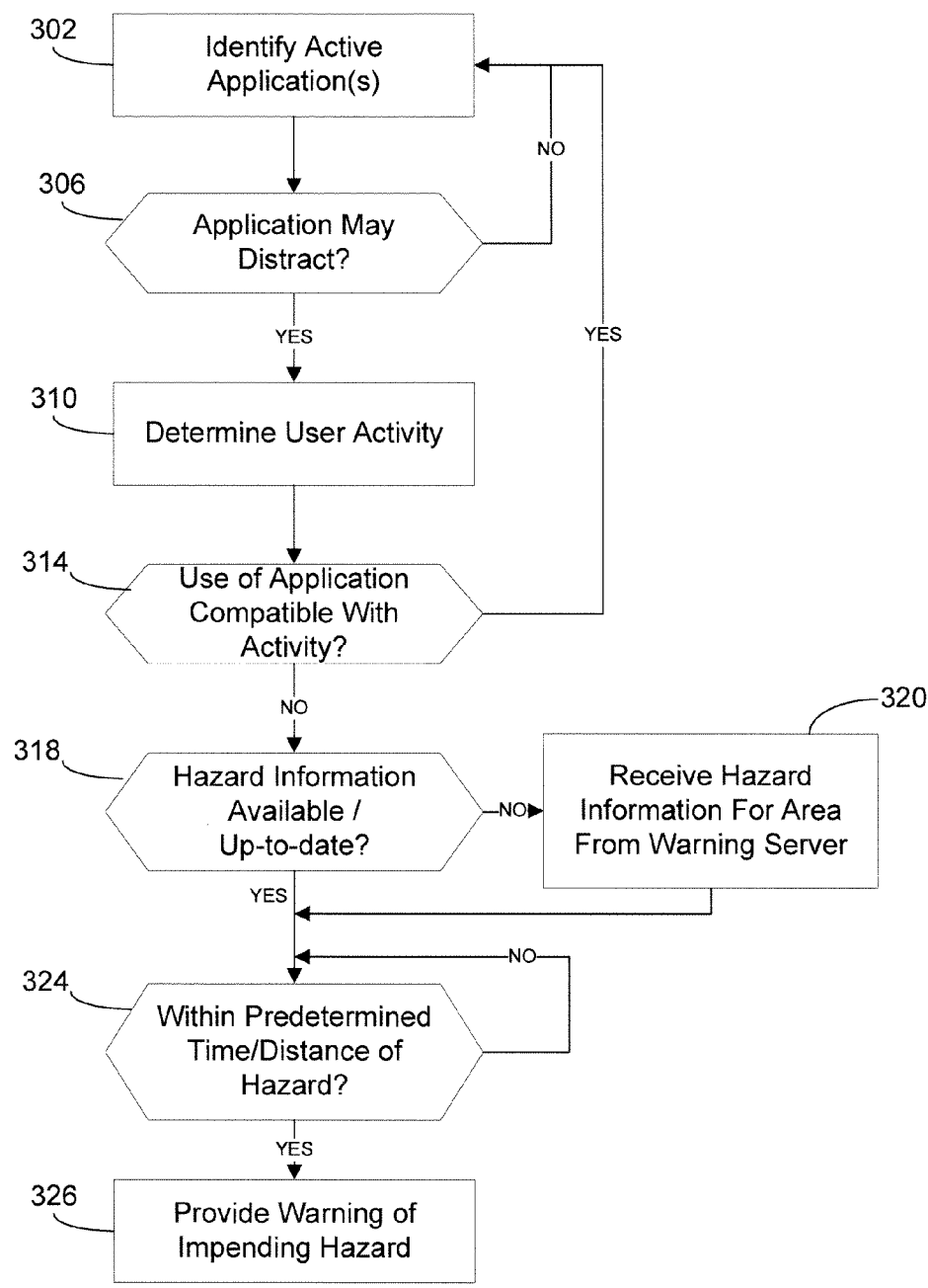
FIG. 3 illustrates an exemplary flow wherein mobile device 103 uses one or more sensors to determine whether to provide an advance warning of an impending danger.

With the foregoing overview of the system and mobile device sensors, it may be helpful now to consider high-level examples of a mobile device 103 providing advance warning of impending dangers on a user output of a mobile device. FIG. 3 illustrates an exemplary flow wherein mobile device 103 uses its sensors to determine whether a user of a mobile device is engaged in potentially dangerous activity. A warning is provided by the mobile device when the user is within a predetermined time/distance of a potential hazard in the direction of motion. For example, a program application on the mobile device 103 is run to configure the mobile device to perform several steps and functions.

In step 302, the mobile device identifies the applications that are currently running. For example, the user of the mobile device 103 may be engaged in one or more social networking activities, such as being involved in a phone conversation, updating or reading Facebook, tweeting on Twitter, text messaging, being involved in video conference, etc. The user may also be listening to music, watching a movie, or playing games.

In step 306, the mobile device 103 determines whether any application, or any combination of applications that are currently running on the mobile device 103, may distract the user for an extended period of time (such as several seconds or more), and, in particular, may distract the user visually. For example, applications requiring visual attention, such as texting, composing an e-mail, and playing an interactive game are more likely to distract a user of a mobile device, than listening to music or talking on the phone. The applications requiring visual attention are potentially more distracting while a user is walking because the eyes of the user should otherwise be focused on the surroundings instead of focused on the mobile device 103. In one example, one or more sensors are used to determine whether the application that the user is engaged in is potentially distracting the user. For example, the front camera of the mobile device may be used to track the eye movement of the user, thereby determining whether the user is watching the screen on the mobile device (e.g., as opposed to the street). A touch screen of the mobile device may indicate that the user is actively entering information into the mobile device. A light sensor may indicate that the mobile device is being used in dark ambient conditions and that the user may not readily see a step or hole in the ground.

In one example, the potentially distracting use of the one or more applications is compared to predetermined criteria. For example, the one or more criteria may be different for each application. If the use of one or more of the applications is not identified as being potentially distracting, the method goes back to the step of monitoring what applications are currently active on the mobile device (step 302).

Upon determining an application on the mobile device (or combination of applications) is used in a potentially distracting manner, user activity is determined in step 310. For example, the user may be engaged in the activity of standing, walking, jogging, climbing stairs, riding in a vehicle, etc. One or more sensors, such as a camera, GPS, accelerometer, gyroscope, compass, microphone/speaker, light sensor, barometer, and/or touch screen may be used to identify user activity. Alternatively, the user may manually activate this alert system and enter the current activity. As provided in the context of the discussion of the sensors, patterns within the accelerometer data may be used to recognize different activities, such as whether the user is standing, jogging, running, biking, on a stationary treadmill, etc. In one example, a barometer is used (e.g., together with the accelerometer) to determine user activity. In one example, the combination of sensor information (e.g., GPS information, accelerometer data, etc.,) provides the mode of transportation. For example, if the GPS coordinates indicate that the user is in the middle of an ocean, it is likely that the user is on a ship. Similarly, if the GPS coordinates indicate that the user is on a highway moving at 55 mph or above (e.g., several hundred mph), the user is likely a passenger in a vehicle. In other embodiments, steps 302 to 310 may be switched so that the user activity is determined prior to determining the applications running.

In step 314, it is determined whether the use of the application on the mobile device is compatible with the user activity. In one example, activities such as walking, jogging, and climbing stairs are considered potentially distracting while other activities, such as riding in a vehicle, flying, and being on a ship are treated the same as sitting (i.e., not potentially distracting). For example, riding in a vehicle is not considered potentially distracting because it is assumed that the user is a passenger. In one example, if the speed (e.g., provided by the GPS receiver) is greater than a predetermined threshold—warnings are not triggered. This speed may be, for example, around 8-12 mph or some other speed sufficient to indicate that walking or jogging (or perhaps moderate speed bicycling) is not being undertaken. Instead, the method goes back to the step of monitoring the active applications on the mobile device (i.e., step 302). Hazard warnings are not triggered because it is presumed that the user of the mobile device is a passenger and the issue of being distracted is likely moot.

In one example, upon determining that the use of the application on the mobile device 103 is not compatible with the user activity, the mobile device 103 determines whether it has hazard information (and/or whether the hazard information is up-to-date) for the area where the mobile device 103 is now located (i.e., step 318). An area is a geographic region such as an area within a predetermined radius, a county, city, places of tourist attractions, etc., from where the mobile device 103 is now or may soon be located. In one example, the more memory the mobile device 103 has, the larger the area for which hazard information may be downloaded and stored. If the mobile device 103 determines that the hazard information is not up-to-date (e.g., more than a day old) or not existent on the mobile device 103, in step 320 the mobile device 103 sends a request to the warning server 33 to receive hazard information therefrom. In one example, the hazard information is updated more frequently in different geographic areas (e.g., updated more frequently in cities versus rural areas). For example, the mobile device 103 uses the mobile communication network 101 to send the request to warning server 33. The request may include the GPS coordinates provided by the GPS receiver of the mobile device 103. In one example, warning server 33 first communicates with CRM server 25 to determine whether the mobile device 103 is subscribed to receive hazard information. Upon receiving a confirmation from the CRM 25, the warning server provides hazard information to the mobile device 103 for a region based on the GPS coordinates provided by mobile device 103. In other examples, the hazard information is periodically updated on the mobile device 103, either through "push" or "pull" communication.

Thus, the hazard information from the warning server 33 may be obtained by the mobile device 103 either through "push" or "pull" communication. For example, a "push" communication is one in which the warning server 33 initiates the communication session and transmits the hazard data to the mobile device 103 (e.g., periodically). The periodicity may vary by area and direction of travel. In another example, the mobile device 103 operates as a client with respect to the warning server 33, and the mobile device 103 itself initiates a request to receive hazard data from the warning server 33. Essentially, the mobile device 103 sends a request to the warning server 33 to "pull" desired data down from the warning server 33 to the mobile device 103. With such an approach, if the warning server 33 wants to send the hazard information to a mobile device 103, the warning server 33 waits for the mobile device 103 to establish a data communication connection with the warning server 33. A quasi-push workaround, also known as an SMS wake up, relies on short message service (SMS) messages to provide the mobile device 103 with the hazard information, or to cause the mobile device 103 to establish a data communication connection with the warning server 33 to pull down the warning information that is made ready by the warning server 33.

Next, in step 326, it is determined whether the mobile device is within a predetermined distance and/or time of a known hazard in the direction of travel. For example, the hazard information (which is now on the mobile device 103) may indicate that there is a street crossing ahead. If the mobile device 103 determines that a predetermined distance from the crossing is reached (e.g., 10 feet), a warning is provided on the mobile device 103 (i.e., step 326). However, in one example, if the direction of travel is parallel to a street (i.e., not in a direction that intersects the street) a warning is not provided, even if the user is within a predetermined threshold distance of the street. However, if the user changes the direction of travel towards the street or it is determined by the mobile device 103 that the street will be intersected in this direction of travel within a predetermined threshold time (e.g., estimated by the speed of travel as detected by the GPS and/or accelerometer), then the advance hazard warning is provided.

In one example, the level of intensity of the warning message on the user output of the mobile device 103 is commensurate with the level of danger. For example, a more powerful combination of haptic, sound, and/or visual warning is provided when approaching a railroad crossing as opposed to approaching a bike trail. Different combinations of warning outputs may signify different types of hazards and/or intensities of the impending danger. The intensity and type may also be escalated in severity as the user approaches at least some hazard (e.g., as the user continues to approach the railroad crossing without interrupting the distracting activity).

Figure 4:
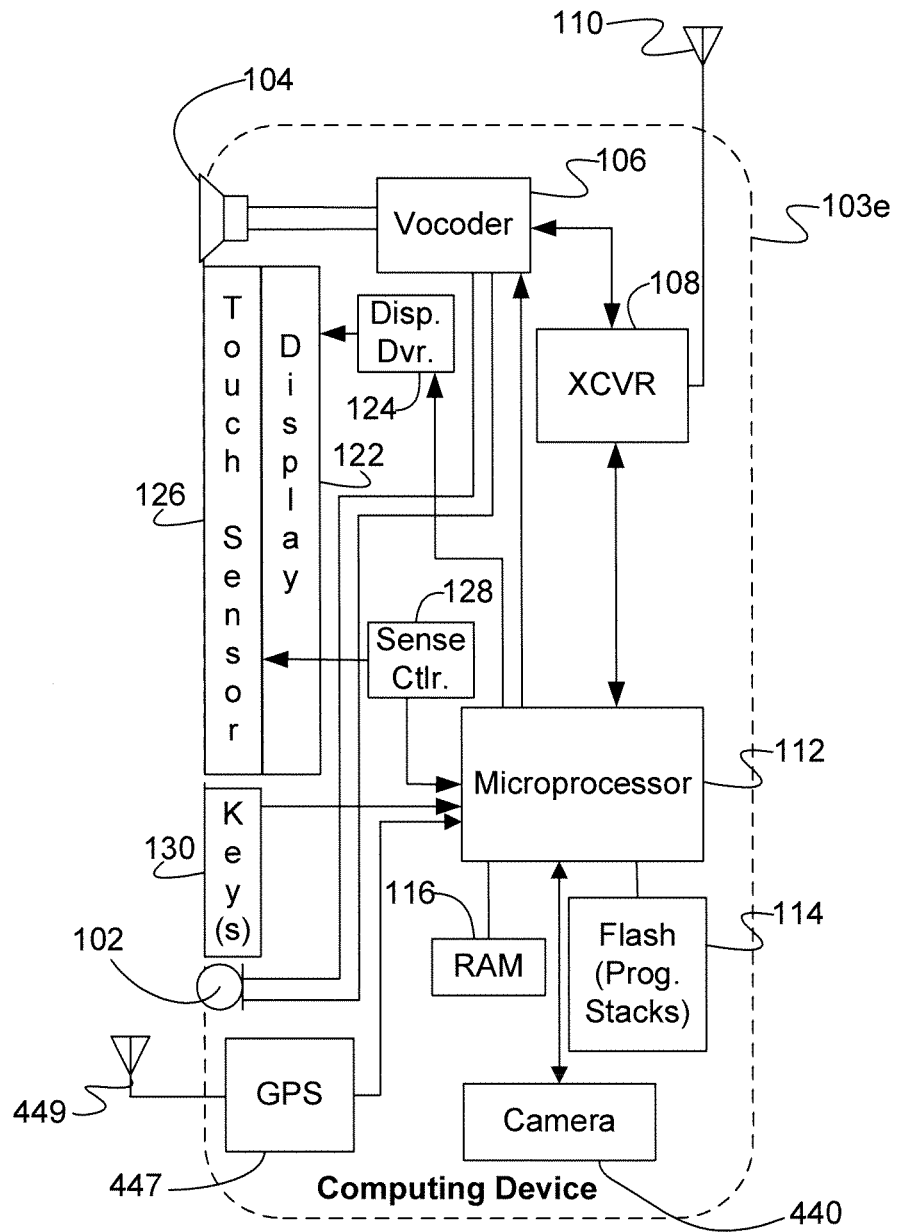
FIG. 4 illustrates a high level simplified function block diagram of an exemplary mobile device.

As shown by the discussion of the method of FIGS. 1 to 3, the advance warning system discussed herein involves an interaction with an appropriately configured mobile device (e.g., 103). A mobile device may be mobile or stationary. While certain sensors were discussed in the context of FIG. 2, it may be useful to consider the functional elements/aspects of an exemplary mobile device, at a high-level. For purposes of such a discussion, FIG. 4 provides a block diagram illustration of an exemplary mobile device 103e. Although the mobile device 103e may be a handset type mobile phone or may be incorporated into another device, such as a personal digital assistant (PDA), a tablet computer, or the like. For discussion purposes, the illustration shows the mobile device 103e in the form of a handheld smart-phone. The smart-phone example of the mobile device 103e may function as a normal digital wireless telephone station. For that function, the mobile device 103e includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications through mobile communication network 101 and possibly voice over packet (Internet Protocol) communications if supported by the mobile device 103e and the data services through the mobile communication network 101.

For digital wireless communications, the mobile device 103e also includes at least one digital transceiver (XCVR) 108. The transceiver (XCVR) 108 could be a multimode transceiver, or the mobile device 103d may include two or more transceivers each of which supports a subset of the various technologies or modes. The concepts discussed here encompass examples of the mobile device 103e utilizing any digital transceivers that conform to current or future developed digital wireless communication standards.

The transceiver 108 provides two-way wireless communication of information, such as vocoded speech samples and/or digital message information, in accordance with the technology of the network 101. In this case, the transceiver 108 also sends and receives a variety of signaling messages in support of the various voice and data services provided via the mobile device 103e and the communication network. Each transceiver 108 connects through RF send and receive amplifiers (not separately shown) to an antenna 110. In the example, the transceiver 108 is configured for RF communication in accord with a digital wireless protocol, such as the current CDMA and 3GPP protocols.

The mobile device 103e includes a display 122 for displaying messages, warning of impending dangers, or the like, call related information dialed by the user, calling party numbers, etc. The mobile device 103e also includes a touch/position sensor 126. The sensor 126 is relatively transparent, so that the user may view the information presented on the user output (i.e., display) 122. A sense controller 128 sensing signals from elements of the touch/position sensor 126 and detects occurrence and position of each touch of the screen formed by the display 122 and sensor 126. The sense circuit 128 provides touch position information to the microprocessor 112, which correlates that information to the information currently displayed via the display 122, to determine the nature of user input via the screen.

The display 122 and touch sensor 126 (and possibly one or more keys 130, if included) are the physical elements providing the textual and graphical user interface for the mobile device 103e. The microphone 102 and speaker 104 may be used as additional user interface elements, for audio input and output. Of course, other user interface elements may be used, such as a trackball, as in some types of smart phones or tablets.

As discussed in the context of FIG. 2, the mobile device 103e may also include one or more digital cameras 440, for capturing still images and/or video clips, as well as tracking the position of the eye(s) of the user. In one example, the mobile device 103e also includes a GPS receiver 447 for communicating with satellites via antenna 449. The mobile device 103e may also include a haptic element (not shown) to provide haptic feedback to the user. Various combinations of the keypad 120, display 122, microphone 102, haptic element, and speaker 104 may be used as the physical input output elements of the graphical user interface (GUI), for multimedia (e.g., audio and/or video) communications. Of course other user interface elements may be used, such as a stylus and touch sensitive display screen, as in a PDA, tablet computer, or smart phone. In addition to normal telephone and data communication related input/output (including message input and message display functions), the user interface elements also may be used for display of notifications and other information to the user and user input of selections, for example, including any needed to provide advance warnings of impending dangers. Additional sensors, such as an accelerometer, gyroscope, compass, light sensor, and barometer may also be included in the mobile device 103e. For example, the combination of sensor information helps determine (i) whether the user of the mobile device is potentially distracted and (ii) what activity he or she is engaged in.

In the example of FIG. 4, a microprocessor 112 serves as a programmable controller or processor, in that it controls all operations of the mobile device 103e in accord with programming that it executes, for all normal operations, and for operations involved in receiving hazard information from warning server 33 and providing advance warning information to the user, as discussed herein. In the example, the mobile device 103e includes flash type program memory 114, for storage of various "software" or "firmware" program routines and mobile configuration settings, such as mobile telephone number (MTN or MDN), etc. The mobile device 103e may also include a non-volatile random access memory (RAM) 116 for a working data processing memory. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112. Accordingly, the mobile device 103e includes a processor, and programming stored in the flash memory 114 configures the processor so that the mobile device is capable of performing various desired functions, including requesting hazard information from warning server 33, providing advance warnings on a user interface, and the like.

As discussed above, functions relating to maintaining hazard information and providing advance warnings of an impending danger can be performed on one or more computers connected for data communication via the components of a packet data network, including mobile devices, in accordance with the methodology of FIG. 3. An exemplary mobile device 103e has been discussed above with respect to FIG. 4. Although special purpose devices may be used as the server(s), for example for any of the servers 25 to 33 in FIG. 1, such devices also may be implemented using one or more hardware platforms intended to represent a general class of data processing device commonly used to run "server" programming so as to implement the functions discussed above, albeit with an appropriate network connection for data communication.

Figure 5:
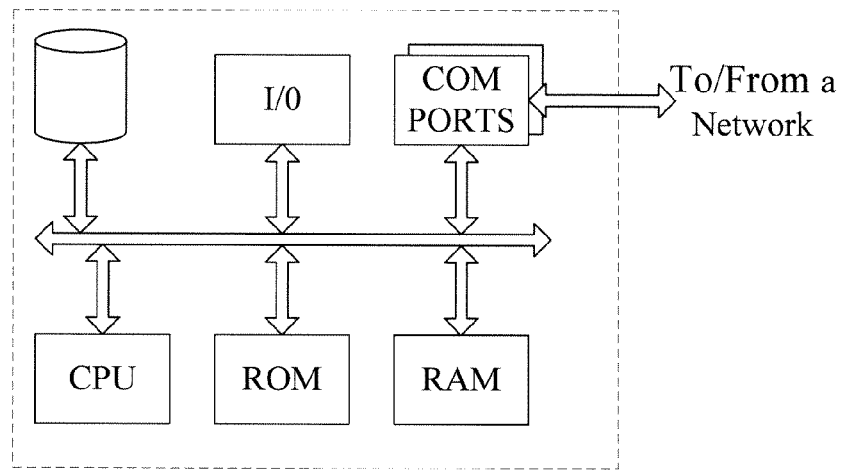
FIG. 5 illustrates a network or host computer.
Figure 6:
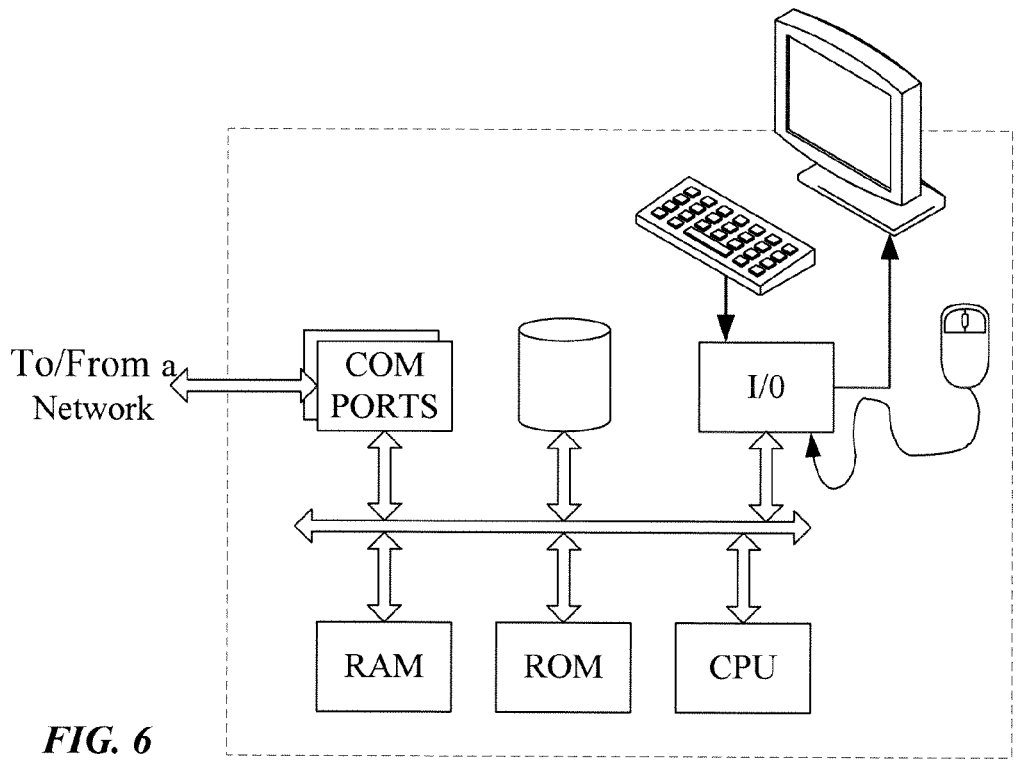
FIG. 6 depicts a computer with user interface elements.

FIGS. 5 and 6 provide functional block diagram illustrations of general purpose computer hardware platforms, as might be used as a warning server 33, CRM 25, or other computers discussed in the examples above. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that programming and general operation of such computer equipment, and as a result the drawings, should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

For example, aspects of the methods maintaining hazard information and providing advance warnings of impending, as outlined above, may be embodied in programming for a server and programming for a mobile device. Program aspects of the technology may be thought of as "products" or "articles of manufacture" typically in the form of executable code and/or associated data that is carried on or embodied in a type of machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

3D: 3 Dimensional
3GPP2: 3'rd Generation Partnership Project 2
BREW: Binary Runtime Environment for Mobile
BS: Base Station
BTS: Base Transceiver System
CDMA: Code Division Multiple Access
CPU: Central Processing Unit
CRM: Customer Relations Management
EVDO: Evolution Data Optimized
GPS: Global Positioning System
GSM: Global System for Mobile
GUI: Graphical User Interface
IMS: Internet Protocol Multimedia Subsystem
LTE: Long Term Evaluation
MDN: Mobile Directory Number
MEMS: Micro-Electro-Mechanical System
MTN: Mobile Telephone Number
PC: Personal Computer
PDA: Personal Digital Assistant
PDN: Packet Data Network
POTS: Plain Old Telephone Service
PSTN: Public Switched Telephone Network
RAM: Random Access Memory
RAN: Radio Access Network
SMS: Short Message Service
TDMA: Time Division Multiple Access
WAN: Wide Area Network
XCVR: Transceiver

What is claimed is:

1. A mobile device, comprising:
a wireless transceiver configured for mobile data communication via a mobile wireless communication network, and configured to receive hazard information from a warning server prior to the mobile device providing a warning;
at least one user output element;
at least one sensor; and
a controller coupled to the transceiver, the at least one sensor, and the at least one user output element, wherein the controller is configured to control operations of the mobile device to implement functions, including functions to:
request updated hazard information from the warning server when the mobile device determines that the hazard information is not available or not up-to-date on the mobile device for an area where the mobile device is located;
determine whether an application running on the mobile device is potentially distracting;
determine an activity of a user of the mobile device, via the at least one sensor;
determine whether the user activity in combination with running of the potentially distracting application is potentially dangerous; and upon determining that the combination is potentially dangerous and that the mobile device is within a predetermined time and/or distance of a hazard based on the updated hazard information, provide a warning on the user output element of the mobile device.

2. The mobile device of claim 1, wherein the controller is further configured to control operations of the mobile device to implement a function to identify, from received hazard information, one or more impending hazards to the user of the mobile device in an area of the mobile device.

3. The mobile device of claim 1, wherein the controller is configured to cause the transceiver to automatically receive the hazard information from the warning server periodically without the mobile device requesting the hazard information.

4. The mobile device of claim 1, wherein: the at least one sensor includes a Global Positioning System (GPS) receiver; and the controller is further configured to control operations of the mobile device to implement a function to send GPS coordinates of the mobile device to the warning server with the request for hazard information.

5. The mobile device of claim 1, wherein:
the at least one sensor includes a Global Positioning System (GPS) receiver and an accelerometer; and
the controller is further configured to help determine the user activity from information from at least one of the GPS receiver or accelerometer.

6. The mobile device of claim 5, wherein:
the at least one sensor further includes:
at least one camera,
a touch screen, and
a microphone; and
the controller is further configured to determine whether the user activity in combination with one or more running applications is potentially dangerous by comparing the user activity in combination with one or more running applications to a predetermined criteria stored in the mobile device.

7. The mobile device of claim 1, wherein:
the at least one sensor includes a camera; and
the controller is further configured to:
track eye movement from information provided by the camera; and
determine whether any currently running applications are potentially distracting from tracked eye movement information.

8. The mobile device of claim 1, wherein the controller is further configured to determine whether any currently running applications are potentially distracting by comparing each currently running application to predetermined criteria stored in the mobile device.

9. The mobile device of claim 1, wherein the controller is further configured to control operations of the mobile device to implement a function to classify the combination of the user activity with any running applications as not dangerous when the mobile device is traveling above a predetermined speed.

10. A mobile device, comprising:
a wireless transceiver configured for mobile data communication via a mobile wireless communication network and to receive hazard information from a warning server prior to providing a warning;
at least one user output element;
at least one sensor; and
a controller coupled to the transceiver, the at least one sensor, and the at least one user output element, wherein the controller is configured to control operations of the mobile device to implement functions, including functions to:
determine whether an application running on the mobile device is potentially distracting;
determine an activity of a user of the mobile device, via the at least one sensor;
request updated hazard information from the warning server when the mobile device determines that the hazard information is not available or not up-to-date on the mobile device for an area where the mobile device is located;
determine whether the user activity in combination with running of the potentially distracting application is potentially dangerous; and
upon determining that the combination is potentially dangerous and that the mobile device is within a predetermined time and/or distance of a hazard indicated from the updated hazard information, provide the warning on the at least one user output element of the mobile device.

11. The mobile device of claim 10, wherein the controller is further configured to control operations of the mobile device to implement a function to identify, from received hazard information, one or more impending hazards to the user of the mobile device in an area of the mobile device.

12. The mobile device of claim 10, wherein the controller is configured to cause the transceiver to automatically receive the hazard information from the warning server periodically without the mobile device requesting the hazard information.

13. The mobile device of claim 10, wherein: the at least one sensor includes a Global Positioning System (GPS) receiver; and the controller is further configured to control operations of the mobile device to implement a function to send GPS coordinates of the mobile device to the warning server with the request for hazard information.

14. The mobile device of claim 10, wherein:
the at least one sensor includes a Global Positioning System (GPS) receiver and an accelerometer; and
the controller is further configured to help determine the user activity from information from at least one of the GPS receiver or accelerometer.

15. The mobile device of claim 10, wherein:
the at least one sensor includes a camera; and
the controller is further configured to:
track eye movement from information provided by the camera; and
determine whether any currently running applications are potentially distracting from tracked eye movement information.

16. The mobile device of claim 10, wherein the controller is further configured to determine whether any currently running applications are potentially distracting by comparing each currently running application to predetermined criteria stored in the mobile device.

17. A mobile device, comprising:
a wireless transceiver configured for mobile data communication via a mobile wireless communication network, and configured to receive hazard information from a warning server prior to the mobile device providing a warning;
at least one user output element;
at least one sensor; and
a controller coupled to the transceiver, the at least one sensor, and the at least one user output element, wherein the controller is configured to control operations of the mobile device to implement functions, including functions to:

identify an application running on the mobile device;

determine whether the identified application is potentially distracting based on use of the application requiring a known extended period of viewing;

determine, by using the at least one sensor, that a user activity is potentially dangerous when the user is distracted;

request updated hazard information from a warning server when the mobile device determines that the hazard information is not available or not up-to-date on the mobile device for the area where the mobile device is located;

determine, using the updated hazard information, whether the mobile device is within a predetermined time and/or distance of a hazard; and in response to determining that the activity is potentially dangerous and determining that the mobile device is within a predetermined time and/or distance of a hazard, provide a warning on the user output element of the mobile device.

18. The mobile device of claim 17, wherein the determination that the user activity is potentially dangerous is made in response to determining that the identified application is potentially distracting.

* * * * *